UNITED STATES PATENT OFFICE.

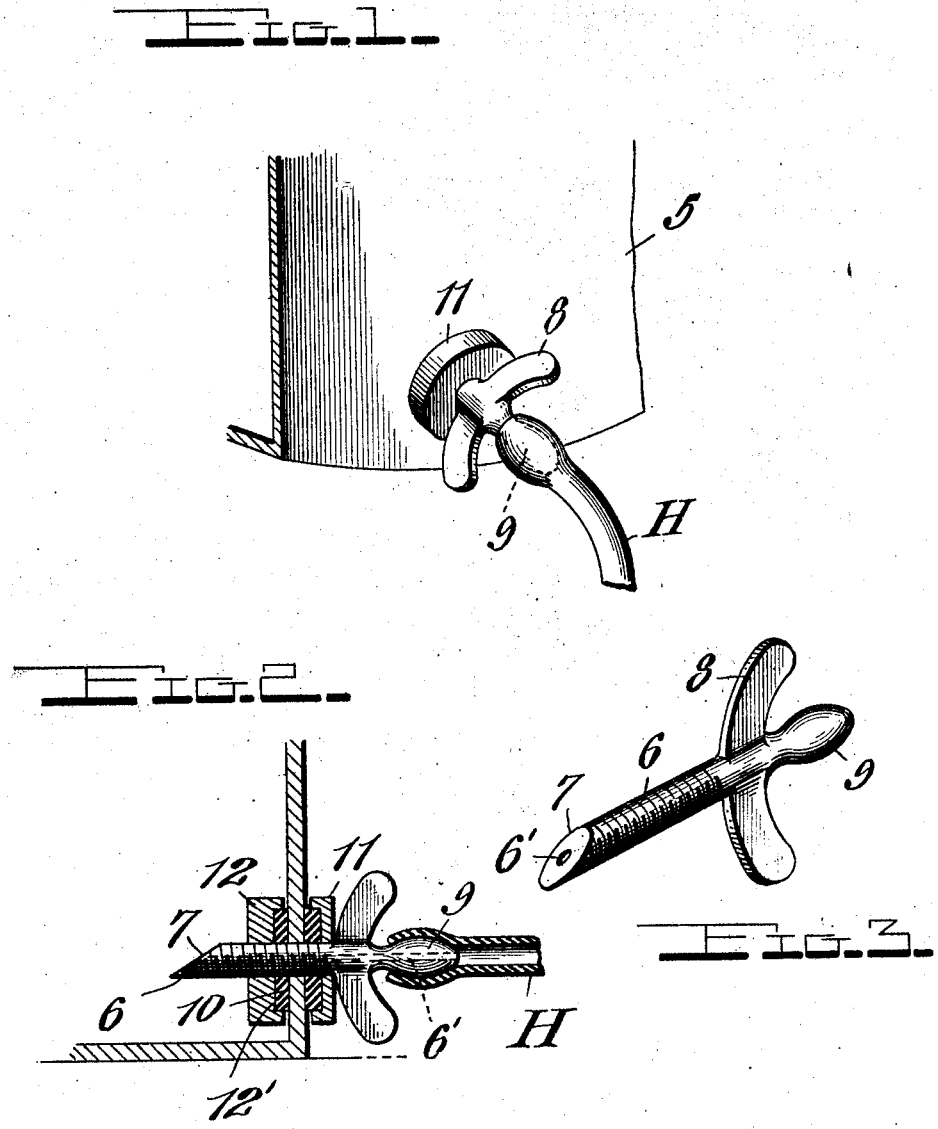

ALBERT N. BARRETT, OF WEED, TERRITORY OF NEW MEXICO.

PAIL ATTACHMENT.

1,006,623.  Specification of Letters Patent.  Patented Oct. 24, 1911.

Application filed July 16, 1910. Serial No. 572,404

*To all whom it may concern:*

Be it known that I, ALBERT N. BARRETT, a citizen of the United States, residing at Weed, in the county of Otero and Territory of New Mexico, have invented certain new and useful Improvements in Pail Attachments, of which the following is a specification, reference being had to the accompanying drawings.

This invention relates to an improved attachment for fastening a flexible hose to a pail or other water receptacle and more particularly to means for fastening the tube of a syringe to a bucket or pail.

The primary object of my invention is to provide a very simple device of the above character whereby the pail may be readily pierced and my attachment disposed through the opening formed therein for the attachment of the rubber tube, means being provided to securely seal the opening in the pail and prevent the escape of water.

A further object of the invention is to provide a threaded shank beveled at one end to form a piercing point and having its other end enlarged for engagement by the end of a flexible tube, rubber washers being arranged on said shank engaged on opposite faces of the body of the pail to securely close the opening which receives said shank.

With these and other objects in view, the invention consists of the novel features of construction, combination and arrangement of parts hereinafter fully described and claimed, and illustrated in the accompanying drawing, in which—

Figure 1 is a fragmentary perspective view of a pail, showing my improved attachment arranged thereon; Fig. 2 is a vertical section; and Fig. 3 is a detail perspective view of the tubular piercing member.

Referring more particularly to the drawings 5 indicates the pail which is of any ordinary form and is constructed of sheet metal or other material. Upon the pail adjacent to the bottom thereof my improved attachment is adapted to be arranged. This attachment comprises a threaded tubular shank 6 one end of which is beveled or inclined as shown at 7. Adjacent to the other end of the shank the wings 8 are formed and are oppositely disposed for engagement by the fingers in arranging the device on the pail. Beyond the wings 8 the shank 6 is of elliptical convex form as shown at 9 so that the end of a flexible hose H may be readily engaged thereon. The shank 6 is longitudinally bored as shown at 6' to conduct the water or other liquid in the pail to the syringe tube H. A rubber washer 10 is arranged upon the shank 6 in engagement with the opposite faces of the side of the pail. A metal cap 11 receives the outer washer and forces the same into close engagement upon the pail as the shank is turned or rotated to properly secure the same in position. A nut 12 is screwed upon the inner end of the shank 6 and is provided in its face with a circular recess 12' which receives the inner washer 10.

In the application of the invention, the metal pail is first pierced by means of a nail or other convenient instrument to provide an opening in which the point of the shank 6 formed by the beveled end 7 thereof may be engaged. The shank 6 is then given a rapid rotary movement and at the same time pressure is brought to bear thereon to force the same through the side of the pail, the opening which is formed by the nail being gradually enlarged. It will be understood of course that the washers are properly arranged in position to be engaged on the shank after it has thus been extended through the pail. The nut 12 and the cap 11 are screwed in opposite directions upon the shank 6 to engage the washers 10 upon the opposite faces of the pail. It will be noted from reference to Fig. 2 that these washers are of greater thickness than the depth of the recesses in the nut and cap so that they project beyond the same and may be closely engaged with the pail about the opening through which the shank extends, the nut and cap being out of contact with the pail. Thus it will be seen that the opening which is formed by the shank 6 is very securely closed and the escape of the liquid from the pail entirely obviated. The syringe hose or tube H may now be attached over the elliptical end of the shank and used in the usual manner.

From the foregoing it will be seen that I have devised a very simple and novel attachment which may be carried by physicians in their pockets so that the syringe hose may be readily attached to the pail in a very few minutes. The device may also be adapted to a large number of other uses other than that above mentioned and it will be understood that I do not wish to be restricted in the development of my invention to any particular application of the same or to the exact form and proportions illustrated in the accompanying drawings, the device being susceptible of considerable modification without departing from the essential feature or sacrificing any of the advantages which accrue thereto.

Having thus described the invention what is claimed is:—

A device of the character described comprising a threaded shank having an elliptical enlargement formed on one of its ends, the longitudinal axis of which is in alinement with the longitudinal axis of said shank, said shank and enlargement having a continuous longitudinal bore, the other end of said shank being beveled to provide a piercing point adapted for cutting engagement with the wall of a vessel through which the shank is adapted to be disposed, washers arranged on said shank for engagement with the opposite faces of the wall of the vessel, a nut threaded on the inner end of said shank having a recess in its face to receive one of the washers, a cap also threaded upon the shank and arranged exteriorly of the vessel, said cap being provided with a recess in one face to receive the other washer, and oppositely disposed finger-pieces integrally formed on the shank adjacent to the enlarged end thereof to be grasped by the operator in forcing the piercing point of the shank through the wall of the vessel, said finger-pieces being also adapted to bear upon the face of said cap to force the washer therein against the wall of the vessel.

In testimony whereof I hereunto affix my signature in the presence of two witnesses.

ALBERT N. BARRETT.

Witnesses:
 L. L. BRITTON,
 D. L. STEPHENS.